(12) United States Patent
Stawitz et al.

(10) Patent No.: US 6,828,455 B2
(45) Date of Patent: Dec. 7, 2004

(54) PREPARATION OF STYRYL COMPOUNDS

(75) Inventors: Josef-Walter Stawitz, Odenthal (DE); Ulrich Feldhues, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 27 days.

(21) Appl. No.: 10/342,942

(22) Filed: Jan. 15, 2003

(65) Prior Publication Data
US 2003/0181752 A1 Sep. 25, 2003

(30) Foreign Application Priority Data
Jan. 18, 2002 (DE) .......................... 102 01 760

(51) Int. Cl.⁷ ............................................. C07C 253/10
(52) U.S. Cl. ........................................ 558/315; 558/361
(58) Field of Search ................................. 558/315, 361

(56) References Cited

U.S. PATENT DOCUMENTS

| | | | |
|---|---|---|---|
| 2,936,319 A | 5/1960 | Merian et al. | 260/465 |
| 3,386,491 A | 6/1968 | Weaver et al. | 260/287 |
| 3,829,461 A | 8/1974 | Raue et al. | 260/465 D |
| 3,920,720 A | 11/1975 | Beecken | 260/465 E |
| 4,006,178 A | 2/1977 | Stagi et al. | 260/465 D |
| 5,214,186 A * | 5/1993 | Shuttleworth | 558/370 |
| 2001/0020313 A1 | 9/2001 | Stawitz et al. | 8/509 |
| 2003/0061670 A1 | 4/2003 | Stawitz et al. | 8/636 |

FOREIGN PATENT DOCUMENTS

| | | |
|---|---|---|
| DE | 1 800 507 | 6/1970 |
| EP | 545 415 | 12/1992 |

* cited by examiner

*Primary Examiner*—Johann Richter
*Assistant Examiner*—Ebenezer Sackey
(74) *Attorney, Agent, or Firm*—Godfried R. Akorli; Diderico van Eyl

(57) ABSTRACT

Process for preparing compounds of the formula (I)

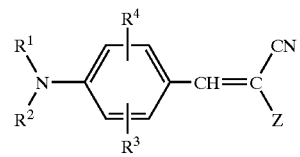

characterized in that an acrylic compound of the formula

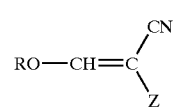

is reacted with an amine of the formula

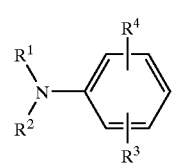

in which $R^1$, $R^2$, $R^3$, $R^4$ and Z are as defined in the description.

11 Claims, No Drawings

PREPARATION OF STYRYL COMPOUNDS

The invention relates to a novel process for preparing styryl compounds and to the use of styryl compounds thus prepared for mass coloration of plastics and for dyeing and printing of hydrophobic fibre materials.

CH-A-56 9055 has already described styryl dyes for dyeing polyester fibres and also for mass coloration of specific plastics.

The preparation of these dyes by the process of CH-A-56 9055, however, is costly and inconvenient.

First of all, the aldehyde of the aniline derivative is prepared by Vilsmeier reaction with dimethylformamide/phosphorous oxychloride and subsequent neutralization and then is condensed with a suitable methylene-active compound, in a solvent, to give the styryl dye.

The apparatus required for preparing this class of dye is technically complex, the synthesis time over all the stages is very long, and the effluents have a high salt load.

It is an object of the present invention, therefore, to provide a simple process for preparing styryl dyes which no longer has the disadvantages of the prior art.

It has been found that this object is achieved by a process for preparing styryl compounds of the formula (I)

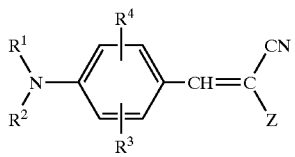
(I)

in particular of the formula (Ia),

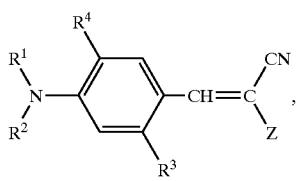
(Ia)

with very particular preference of the formula (Ib)

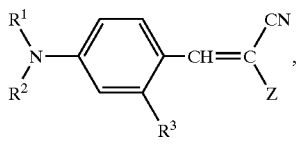
(Ib)

in which $R^1$ and $R^2$ independently of one another stand for $C_1$–$C_{12}$ alkyl, which may be substituted by halogen such as F, Cl, Br, by hydroxyl, cyano, —$OR^5$, $SR^5$,

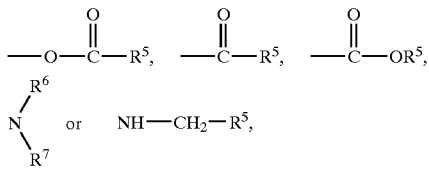

or for optionally substituted alkoxylates, preferably those of the formula

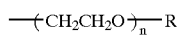

in which

R stands for H or optionally substituted phenyl, in particular phenyl substituted by halogen, preferably Cl or F, by $C_1$–$C_8$ alkyl and/or by $C_1$–$C_8$ alkoxy, and n stands for a number from 1 to 50, in particular from 1 to 20, especially those of ethylene oxides having an average degree of alkoxylation of from 1 to 50, preferably from 1 to 20, or $R^1$ stands for the radical of the formula (III)

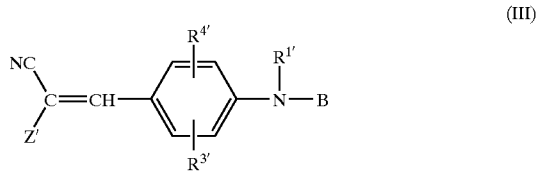
(III)

in which $R^{1'}$, $R^{3'}$, $R^{4'}$ and $Z'$ are as defined for the radicals $R^1$, $R^3$, $R^4$ and Z above or below, or $R^1$ and $R^2$ together form a $C_4$–$C_6$ alkylene radical, $R^5$ stands for $C_1$–$C_{12}$ alkyl or $C_6$–$C_{10}$ aryl, especially phenyl and naphthyl, it being possible for the aryl to be substituted, for example, by halogen such as Br, Cl, F, or by alkyl, carbonyl or carboxylic esters, $R^6$ and $R^7$ stand independently of one another for optionally substituted aryl or alkyl, $R^3$ and $R^4$ stand independently of one another for hydrogen, $C_1$–$C_6$ alkyl, trifluoromethyl, $C_1$–$C_4$ alkoxy, phenoxy and halogen such as F, Cl, Br, Z stands for

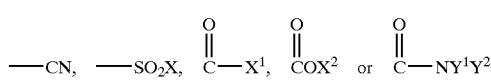

in which X, $X^1$, $X^2$, $Y^1$ and $Y^2$ independently of one another stand for $C_1$–$C_6$ alkyl, $C_5$–$C_7$ cycloalkyl, $C_1$ to $C_3$ alkylphenyl or for optionally substituted phenyl or naphthyl, it being additionally possible for $Y^1$ and $Y^2$ together with the nitrogen atom to which they are attached to form a 5–7-membered saturated heterocycle, characterized in that a mixture of a trialkyl orthoformate of the formula (V) and a methylene-active compound of the formula (VI)

$$CH(OR)_3 \quad (V)$$

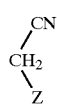
(VI)

or of an acrylic compound of the formula VII

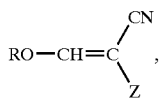  (VII)

prepared preferably from (V) and (VI), is reacted with an amine of the formula

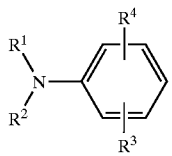  (IV)

where $R^1$, $R^2$, $R^3$ and $R^4$ are as defined above.

All abovementioned $C_1$–$C_{12}$ alkyl radicals may be substituted, for example, by OH, CN, halogen or $C_1$–$C_6$ alkoxy.

For the purposes of this specification alkyl means preferably $C_1$–$C_{12}$ alkyl, especially methyl, ethyl, n-propyl, n-butyl, n-pentyl, n-hexyl, n-dodecyl, n-octyl and n-nonyl, and also the corresponding branched alkyls.

Abovementioned aryl radicals may be substituted, for example, by halogen, especially F, Cl or Br, by $C_1$–$C_{12}$ alkyl, $C_4$–$C_7$ cycloalkyl, especially cyclopentyl, cyclohexyl, or by $C_1$–$C_4$ alkoxy or benzyl.

Preferred styryl compounds are those of the formula (II)

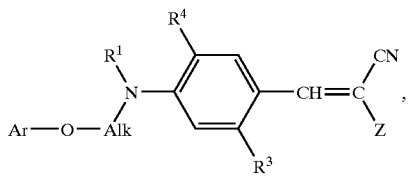  (II)

in which

R¹, R³, R⁴ and Z are as defined above,

Alk is a $C_2$–$C_4$ alkylene group,

Ar is phenyl, naphthyl or a phenyl or naphthyl radical which contains at least one $C_1$–$C_{16}$ alkyl such as propyl, isopropyl, butyl, isobutyl, tert-butyl, isooctyl, isononyl, lauryl, $C_5$–$C_7$ cycloalkyl such as cyclopentyl, cyclohexyl, $C_1$–$C_{12}$ alkylmercapto, $C_5$–$C_7$ cycloalkylmercapto, phenyl-$C_1$–$C_3$-alkylmercapto, phenylmercapto or hetarylmercapto substituent, and is optionally substituted by further substituents such as, for example, $C_1$–$C_6$ alkyl, $C_5$–$C_7$ cycloalkyl, $C_1$ to $C_3$ alkylphenyl or halogen radicals such as F, Cl or Br.

Preference is also given to styryl compounds of the formula (VIII)

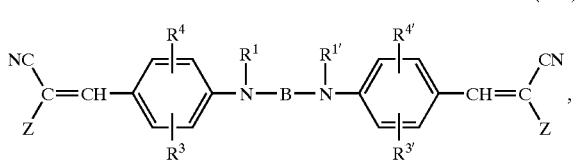  (VIII)

where B stands for optionally substituted $C_2$–$C_6$ alkylene which may optionally be interrupted by one or more heteroatoms from the group consisting of O and CO or for one of the radicals of the formulae

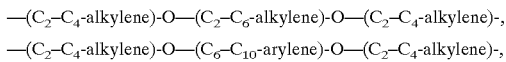
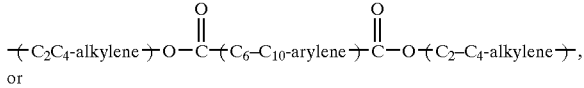
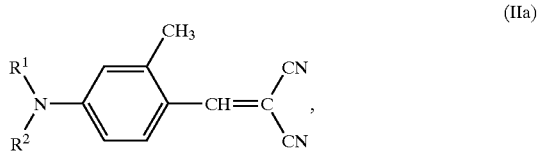
or

in which the alkylene and arylene groups may be substituted.

Particularly preferred styryl compounds are those of the formula (II) in which

Ar is a phenyl or naphthyl radical which contains at least one $C_1$–$C_{16}$ alkyl such as propyl, isopropyl, butyl, isobutyl, tert-butyl, isooctyl, isononyl, lauryl, $C_5$–$C_7$ cycloalkyl such as cyclopentyl or cyclohexyl, $C_1$–$C_{12}$ alkylmercapto, $C_5$–$C_7$ cycloalkylmercapto, phenyl-$C_1$–$C_3$-alkylmercapto, phenylmercapto or hetarylmercapto substituent.

Preferred compounds of the formula (I) are those of the formula (IIa)

  (IIa)

in which $R^1$ and $R^2$ are as defined above.

In one preferred embodiment of the process of the invention the acrylic compound of the formula (VII)

  (VII)

is formed by reacting the compounds of the formulae $CH(OR)_3$  (V)

(VI)

The compounds of the formulae (V) and (VI) may be used directly in a mixture with the amine (IV) or in a step beforehand may be separately precondensed and, if desired, isolated, to form the acrylic compound of the formula (VII), which is reacted with the amine in a second step.

In one preferred embodiment of the process of the invention the molar ratio of compounds IV to VII is from 1:1.0 to 1:1.4, from 1:1.0 to 1:1.2, in particular from 1:1.0 to 1:1.1.

Preferred compounds of the formula (V) are trimethyl orthoformate and triethyl orthoformate.

The process of the invention is preferably conducted in an organic solvent or in excess orthoformate, solvents being compounds which do not undergo reaction with the reactants or products under the reaction conditions.

Preferred solvents used are dioxane, chlorinated hydrocarbons, benzene, chlorobenzene, dichlorobenzene, toluene, xylene, N-methylpyrrolidone (NMP), dimethylformamide (DMF), dimethyl sulphoxide and alcohols such as methanol, ethanol, propanols, butanols, pentanols, hexanols, heptanols, octanols, glycols such as ethylene glycol, diethylene glycol and the corresponding monoalkyl and dialkyl ethers of the glycols; very particular preference is given to using n-butanol, n-octanol, DMF and NMP or mixtures of these solvents.

The process of the invention preferably takes place at a temperature of from 70 to 180° C., in particular at from 90 to 140° C. It is operated, for example, under reflux, with some or all of the alcohol formed being distilled off optionally. It is also possible to operate under pressure in a closed system above the boiling point of the solvent used or of at least one reaction component, or else in the alcohol HOR which is released.

In one preferred embodiment of the process of the invention the reaction mixture is evaporated to dryness and the dry residue is then recrystallized from an appropriate solvent. With particular preference, the reaction mixture is cooled and filtered and the filter cake is washed with alcohol and water and then dried.

In the context of this invention, therefore, a condensation reaction is understood to be a reaction in the course of which alcohol is released.

The condensation of the invention proceeds readily even without further additions. As catalysts it is possible to add zinc compounds such as zinc dust or zinc halides, e.g. $ZnCl$, $ZnBr_2$ or $ZnJ_2$, or copper compounds such as $CuCl$, for example.

In one preferred embodiment, from 1.0 to 1.2 mole equivalent of compound V in butanol are mixed with 1.0 mole equivalent of the amine IV and, following the addition of from 1.1 to 1.3 mole equivalent of trimethyl orthoformate, optionally in the presence of a catalyst, the mixture is heated at reflux, optionally with distillative removal of the alcohol, such as methanol or ethanol, that is formed, until the components used have undergone reaction. The reaction mixture is then cooled and filtered and the filter product is washed with methanol and water and dried.

A very particularly preferred procedure is to introduce the amine IV in butanol at 120° C., preferably at 110° C., then to add slowly, dropwise, a solution of malodinitrile (VI) and trimethyl orthoformate (V) in butanol, and then to maintain the temperature at 120° C., preferably 110° C., until the components have undergone reaction.

Also found has been a process for preparing styryl compounds of the formula (I), characterized in that compounds of the formulae (IV), (V) and (VI)

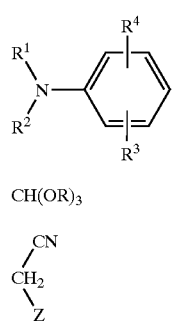

(IV)

$CH(OR)_3$ (V)

$$CH_2 \begin{matrix} CN \\ Z \end{matrix}$$ (VI)

in which

R stands for $C_1$–$C_6$ alkyl, in particular for methyl or ethyl, and $R^1$, $R^2$, $R^3$, $R^4$ and Z are as defined above, are reacted with one another. The procedures described above apply to this reaction as well.

In one preferred embodiment of the process of the invention the molar ratio of compounds IV to V to VI is from 1:1:1 to 1:2.0:1.4, in particular from 1:1:1 to 1:1.3:1.2.

In one preferred embodiment of the process of the invention for preparing the compound VII the molar ratio of compounds V to VI is from 1:1 to 2.0:1.4, in particular from 1:1 to 1.2:1.1.

The dyes obtained in accordance with the invention are outstandingly suitable for dyeing and printing hydrophobic fibre materials, especially polyesters, examples being those formed from terephthalic acid and ethylglycol or 1,4-bis(hydroxy-methyl)cyclohexane, polycarbonates, examples being those formed from α,α-dimethyl-4,4'-dihydroxydiphenylmethane and phosgene, and cellulose esters, an example being cellulose triacetate, and fibres based on polyvinyl chloride.

The dyes may be employed by the known dyeing processes, for example in the exhaust process, as aqueous dispersions in the presence of customary dispersants and optionally customary carriers at temperatures near to 100° C. or without carriers at 120 to 140° C. (HT process). They are further excellently suited to dyeing by the known thermosol process. Their staining of wool and cotton present in the dyebath at the same time is minimal or zero, so making them very useful for dyeing polyester/wool and polyester/cellulose fibre blends. They possess excellent solubility in numerous organic solvents and can be used for coloration of paints, oils, plastics, such as polystyrene and polyethylene, in the mass and of fibres by the customary spin dyeing methods.

The dyes obtained in accordance with the invention give the hydrophobic materials mentioned bright yellow dyeings of very good light fastness and good fastness to washing and sublimation. They can be combination dyed with blue azo and anthraquinone disperse dyes, and in that utility produce green dyeings of very good light fastness, which do not exhibit catalytic fading, on cellulose triacetate and on polyester. Particularly noteworthy is the good dyebath stability and boiling stability of the dyes obtained in accordance with the invention in neutral to moderately basic liquors and printing pastes (pH stability up to about pH 10), with the consequence that they are also very suitable for single-bath dyeing (thermosol thermofixing processes) and printing of polyester/cotton blends in combination with reactive dyes which require the presence of alkali (sodium carbonate, sodium hydrogen carbonate).

The term mass coloration as used herein comprehends in particular processes in which the dye is incorporated into the molten plastics material, for example with the aid of an extruder, or in which the dye is already added to starting components for preparing the plastic, for example to monomers before the polymerization.

Particularly preferred plastics are thermoplastics, for example vinyl polymers, polyesters, polyamides and also polyolefins, especially polyethylene and polypropylene, or polycarbonates.

Suitable vinyl polymers are polystyrene, styrene-acrylonitrile copolymers, styrene-butadiene copolymers, styrene-butadiene-acrylonitrile terpolymers, polymethacrylate, polyvinyl chloride, etc.

Useful plastics further include polyesters such as, for example, polyethylene terephthalates, polycarbonates and cellulose esters.

Preference is given to polystyrene, styrene copolymers, polycarbonates, polymethacrylates and polyamides. Particular preference is given to polystyrene, polyethylene and polypropylene.

The high molecular mass compounds mentioned can be present individually or in mixtures, as plastically deformable compositions or as melts.

The dyes of the invention are preferably employed in finely divided form, for which the use of dispersants is possible but not mandatory.

Where the dye mixture is used after polymerization, it is preferably ground or mixed dry with the polymer chips and this mixture is plastified and homogenized, for example on mixing rolls or in screws. Alternatively, the dyes can be added to the liquid melt and homogeneously dispersed by stirring. The material precoloured in this way is then processed further in the customary fashion, for example by spinning into bristles, filaments, etc. or by extrusion or injection moulding to form shaped components.

Since the dyes are stable to polymerization catalysts, particularly peroxides, it is also possible to add the dye to the monomeric starting materials for the plastics and then to carry out polymerization in the presence of polymerization catalysts. To this end the dye is preferably dissolved in or intimately mixed with the monomeric components.

The dyes of the invention are preferably used for colouring the said polymers in amounts of from 0.0001 to 1% by weight, in particular from 0.01 to 0.5% by weight, based on the amount of polymer.

By adding pigments which are insoluble in the polymers, such as titanium dioxide, for example, it is possible to obtain corresponding valuable hiding colorations.

Titanium dioxide can be used in an amount of from 0.01 to 10% by weight, preferably from 0.1 to 5% by weight, based on the amount of polymer.

The process of the invention produces transparent or hiding brilliant orange colorations having good heat resistance and also good light, weather and sublimation fastness.

In the process of the invention it is also possible to use mixtures of the dye mixture of the formula (I) according to the invention with other dyes and/or with organic and/or inorganic pigments.

The invention is illustrated but not restricted by the examples below, in which parts and percentages are by weight (% by weight).

EXAMPLE 1

30.0 g of malodinitrile, 57 g of trimethyl orthoformate and 152 g of the amine of the formula (1)

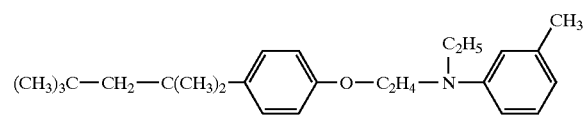

(1)

are heated in 400 ml of butanol to 110° C. over the course of 2 hours, during which methanol is distilled off, and are held at from 110 to 115° C. for 16 hours. After cooling to 25° C., the reaction mixture is filtered with suction and the solid product is washed in succession with 100 ml of butanol, 400 ml of methanol and 800 ml of hot water.

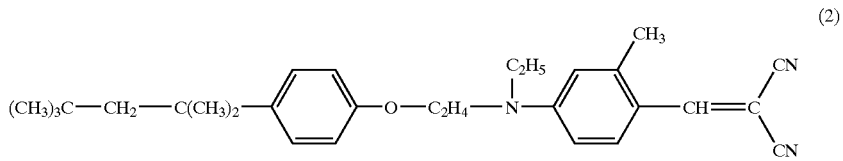

(2)

Drying of the filter cake gives 148.6 g of dye of the formula (2). It colours polystyrene in the mass in a bright, greenish yellow.

Analogously to Example 1, the following dyes are formed by reaction with the amines listed:

| Example | Amines (IV) | Dye (I) |
|---|---|---|
| 2. | 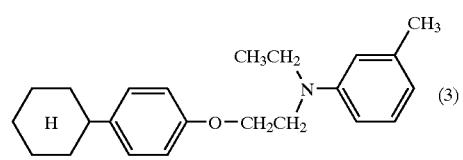 (3) | 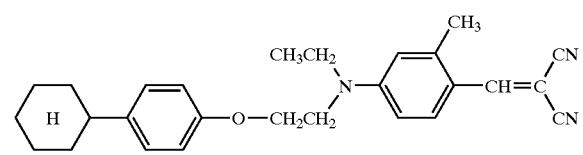 |

| Example | Amines (IV) | Dye (I) |
|---|---|---|
| 3. | | |
| 4. | | |
| 5. | | |
| 6. | | |
| 7. | | |

EXAMPLE 8

A mixture of 34 g of malodinitrile, 110 g of diethyl orthoformate and 120 g of acetic anhydride is heated at 100° C. for 4 hours. The temperature is then raised to 140° C. and the low-boiling constituents are removed by distillation. After 2 hours at 140° C. the reaction mixture is distilled in vacuo (about 20 mbar). 58.4 g of ethoxymethylenemalodinitrile of the formula $$CH_3CH_2OCH=C(CN)_2$$

are isolated as a uniform fraction (b.p. 155 to 160° C.).

36.7 g of aniline derivative of the formula 1 from Example 1 and 15.3 g of ethoxymethylenemalodinitrile from above are dissolved in 150 ml of butanol and the solution is, heated at reflux (115–120° C.). After 38 hours of reflux the mixture is cooled to room temperature and filtered with suction and the filter cake is washed with 200 ml of methanol and 500 ml of hot water. 31.4 g of a yellow styryl dye identical with that of Example 1 are isolated.

What is claimed is:

1. A process for preparing compounds of the formula (I)

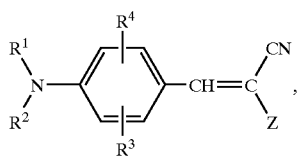

(I)

in which $R^1$ and $R^2$ independently of one another stand for unsubstituted or substituted $C_1$–$C_{12}$ alkyl, wherein the substituents are selected from the group consisting of halogen hydroxyl, cyano, —$OR^5$, $SR^5$,

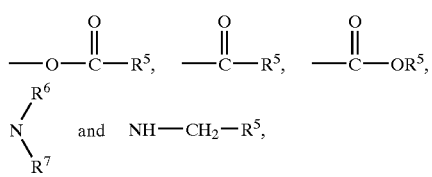

or for optionally substituted alkoxylates, or $R^1$ stands for the radical of the formula (III)

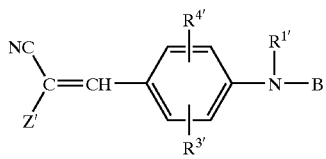

(III)

where B stands for optionally substituted $C_2$–$C_6$ alkylene which may optionally be interrupted by one or more heteroatoms from the group consisting of O and CO or for one of the radicals of the formulae —($C_2$–$C_4$-alkylene)-O—($C_2$–$C_6$-alkylene)-O—($C_2$–$C_4$-alkylene)-, —($C_2$–$C_4$-alkylene)-O—($C_6$–$C_{10}$-arylene)-O—($C_2$–$C_4$-alkylene)-, $-(C_2C_4\text{-alkylene})-O-\overset{O}{\overset{\|}{C}}-(C_6-C_{10}\text{-arylene})-\overset{O}{\overset{\|}{C}}-O-(C_2-C_4\text{-alkylene})-$, or $-(C_2C_4\text{-alkylene})-O-\overset{O}{\overset{\|}{C}}-(C_2-C_6\text{-alkylene})-\overset{O}{\overset{\|}{C}}-O-(C_2-C_4\text{-alkylene})-$, in which the alkylene and arylene groups may be substituted,
in which $R^{1'}$, $R^{3'}$, $R^{4'}$ and $Z'$ are as defined for the corresponding radicals $R^1$, $R^3$, $R^4$ and $Z$ above or below, or $R^1$ and $R^2$ together form a $C_4$–$C_6$ alkylene radical, $R^5$ stands for $C_1$–$C_{12}$ alkyl or unsubstituted or substituted $C_6$–$C_{10}$ aryl, wherein the substituents are selected from the group consisting of halogen alkyl, carbonyl and carboxylic esters, $R^6$ and $R^7$ stand independently of one another for unsubstituted or substituted aryl or alkyl, $R^3$ and $R^4$ stand independently of one another for hydrogen, $C_1$–$C_6$ alkyl, trifluoromethyl, $C_1$–$C_4$ alkoxy, phenoxy and halogen, Z stands for $-CN,\quad -SO_2X,\quad \overset{O}{\overset{\|}{C}}-X^1,\quad \overset{O}{\overset{\|}{COX^2}}\quad \text{or}\quad \overset{O}{\overset{\|}{C}}-NY^1Y^2$ in which X, $X^1$, $X^2$, $Y^1$ and $Y^2$ independently of one another stand for $C_1$–$C_6$ alkyl, $C_5$–$C_7$ cycloalkyl, $C_1$ to $C_3$ alkylphenyl or for unsubstituted or substituted phenyl or naphthyl,
it being additionally possible for
$Y^1$ and $Y^2$ together with the nitrogen atom to which they are attached to form a 5–7-membered saturated heterocycle, comprising the steps of reacting a mixture of a trialkyl orthoformate of the formula (V) and a methylene-active compound of the formula (VI)

CH(OR)$_3$ (V)

$\begin{array}{c} CN \\ / \\ CH_2 \\ \backslash \\ Z \end{array}$ (VI)

or of an acrylic compound of the formula VII
Where R stands for $C_{1-6}$ alkyl $RO-CH=C\begin{array}{c}CN\\ \backslash \\ Z\end{array}$ (VII)

with an amine of the formula

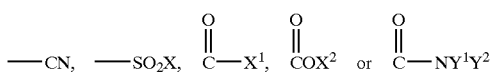

(IV)

where $R^1$, $R^2$, $R^3$ and $R^4$ are as defined above.

2. The process according to claim 1, wherein the molar ratio of compounds IV to VII is from 1:1.0 to 1:1.4.

3. The process according to claim 1, wherein the compound of the formula VII is obtained by reacting compounds of the formula (V) and (VI)

CH(OR)$_3$, (V)

$\begin{array}{c} CN \\ / \\ CH_2 \\ \backslash \\ Z \end{array}$ . (VI)

4. The process for preparing compounds according to claim 1, wherein compounds of the formulae (IV), (V) and (VI)

(same structure as IV above) (IV)

CH(OR)$_3$, (V)

$\begin{array}{c} CN \\ / \\ CH_2 \\ \backslash \\ Z \end{array}$ , (VI)

in which
R stands for $C_1$–$C_6$ alkyl, in particular for methyl or ethyl, and
$R^1$, $R^2$, $R^3$, $R^4$ and Z are as defined in claim 1,
are reacted with one another.

5. The process according to claim 1, wherein the molar ratio of compounds IV to V to VI is from 1:1:1 to 1:2.0:1.4.

6. The process according to at least one of claims 1 to 5, wherein the process is conducted in an organic solvent or in orthoformate.

7. The process according to at least one of claims 1 to 5, wherein the process takes place at a temperature of from 70 to 180° C.

8. The process according to at least one of claims 1 to 5, wherein the process takes place in the presence of a catalyst.

9. The process according to at least one of claims 1 to 8, wherein the process takes place in an organic solvent, at a temperature of from 70 to 180° C., and in the presence of a catalyst.

10. The process according to claim 1, wherein $R^1$ and $R^2$ independently of one another in addition stand for aloxylates of the formula

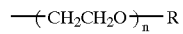

in which
  R stands for H or optionally substituted phenyl, by $C_1$–$C_8$ alkyl and/or by $C_1$–$C_8$ alkoxy, and
  n stands for a number from 1 to 50, in particular from 1 to 20.

11. The process according to claim 1, wherein $R^1$ and $R^2$ independently of one another in addition stand for ethylene oxides having an average degree of alkoxylation of 1–50.

* * * * *